(12) United States Patent
Kuo et al.

(10) Patent No.: US 8,482,911 B2
(45) Date of Patent: Jul. 9, 2013

(54) NOTEBOOK COMPUTER AND CASINGS FOR CHANGING THE APPEARANCE OF THE COMPUTER

(75) Inventors: Chien-Bang Kuo, Taipei (TW); Ying-Shen Cheng, Taipei (TW)

(73) Assignee: Clevo Co., Taipei (TW)

( * ) Notice: Subject to any disclaimer, the term of this patent is extended or adjusted under 35 U.S.C. 154(b) by 360 days.

(21) Appl. No.: 12/926,696

(22) Filed: Dec. 6, 2010

(65) Prior Publication Data

US 2011/0154647 A1   Jun. 30, 2011

(30) Foreign Application Priority Data

Dec. 30, 2009 (TW) .............................. 98224728 U

(51) Int. Cl.
| | |
|---|---|
| *G06F 1/16* | (2006.01) |
| *H05K 5/00* | (2006.01) |
| *H05K 7/00* | (2006.01) |
| *A47B 97/00* | (2006.01) |
| *A47B 67/00* | (2006.01) |

(52) U.S. Cl.
USPC ............ 361/679.27; 361/679.02; 361/679.21; 312/223.2

(58) Field of Classification Search
USPC ............ 29/428; 361/679.02, 679.04–679.07, 361/679.09, 679.21–679.24, 679.26–679.29; 312/223.1–223.2
IPC ...................................................... H05K 13/00
See application file for complete search history.

(56) References Cited

U.S. PATENT DOCUMENTS

| | | | | |
|---|---|---|---|---|
| 6,744,622 | B2 * | 6/2004 | Lee et al. ................. | 361/679.09 |
| 7,573,702 | B2 * | 8/2009 | Hong et al. .............. | 361/679.26 |
| 7,940,520 | B2 * | 5/2011 | Bhutani .................... | 361/679.21 |
| 2008/0019089 | A1 * | 1/2008 | Chi et al. ....................... | 361/681 |
| 2009/0291722 | A1 * | 11/2009 | Li et al. ....................... | 455/575.4 |

\* cited by examiner

*Primary Examiner* — David Bryant
*Assistant Examiner* — Matthew Travers
(74) *Attorney, Agent, or Firm* — Bacon & Thomas, PLLC

(57) ABSTRACT

A notebook computer includes a data processing unit, and a display unit pivotally connected with one side of the data processing unit. The display unit has a first casing member, a second casing member, and a third casing member. The first casing member is immovably disposed on the third casing member. The second casing member is separably combined upon the first casing member, which includes a plurality of first through slots, second through slots and a plurality of protrusions. The second casing member includes a plurality of first baffles and second baffles. The first casing member and second casing member can be easily combined with or separated from each other.

19 Claims, 5 Drawing Sheets

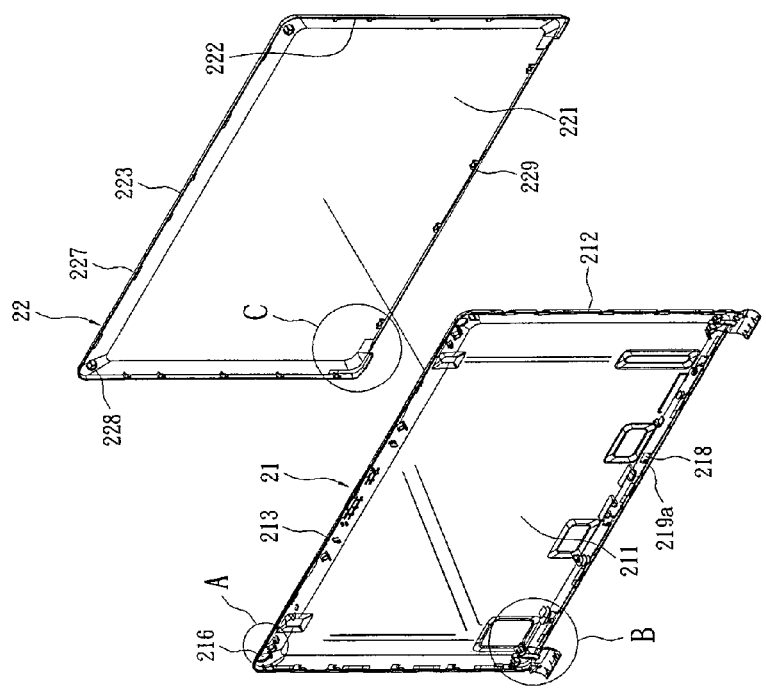
FIG. 3
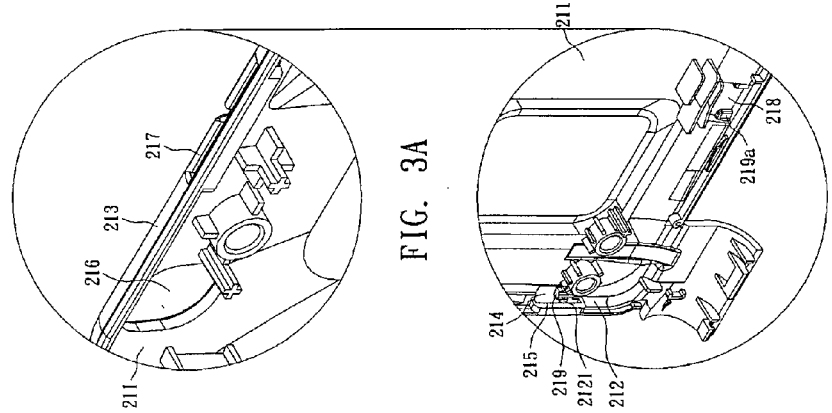
FIG. 3A
FIG. 3B

NOTEBOOK COMPUTER AND CASINGS FOR CHANGING THE APPEARANCE OF THE COMPUTER

BACKGROUND OF THE INVENTION

1. Field of the Invention

The present invention generally relates to a notebook computer and its casings, and more particularly to the notebook computer having a changeable appearance.

2. Description of Related Art

According to the recent development aspects of a notebook computer, in addition to its progressive functionalities, the outward appearance of the computer has obvious innovation and importance. The appearance of a modern notebook computer is becoming increasingly attractive, and is a major factor affecting the consumer's purchase decision, even more so than the computer's functions.

However, with time, the consumer holding the notebook computer realizes an "edge effect" to its outward appearance. It means the consumer may not be as attracted by the appearance as time passes.

Therefore a changeable case for the notebook computer has been developed. Reference is made to R.O.C. Patent No. M329195, which illustrates a protection cover of a notebook computer. At the time the consumer is used to the notebook computer with its familiar appearance, the original protection cover can be removed from the top cover, and replaced by another cover with a different pattern or color. Then the notebook computer has it own new appearance.

Technologically, the protection cover and the top casing of the notebook are combined using a lock force generated by their sizes. If the lock force is too strong, it is difficult to combine the protection cover and the top casing; if the lock force is too small, the combination may be easily loosened.

SUMMARY OF THE INVENTION

One of the major objectives of the present invention is to provide a notebook computer changeable with casings. In particular, the casings are easily taken apart and securely combined.

To achieve the above objective, the casing of the notebook computer includes a first casing member having a first main board, two first side boards and many protrusions. In which, a plurality of first through slots are disposed at the two separate sides of the first main board. The two first side boards are respectively disposed at the two sides of the first main board. A plurality of first through slots are separately channeled to the second through slots. The protrusions are separately disposed into the first through slots. Further, the second casing member can be separably combined with the first casing member.

Still further, the second casing member includes a second main board, two second side boards, many first baffles, and second baffles. In which, the second side boards are respectively disposed at the two sides of the second main board. The first baffles are separately disposed on the inside of the two second side boards. The second baffles are separately disposed on the inside of the first baffles. In particular, the length of the first baffle is longer than the second baffle. The first baffles are separately movable inside the second through slot. The second baffles are movable inside the first through slot.

When the first baffles and the second baffles move to a specific position, the first baffles are separately positioned on the inside of the first main board. The second baffles are therefore at the inner sides of the protrusions.

For achieving the abovementioned objective, a notebook computer is provided. The notebook computer primarily includes a data processing unit and a display unit. The display unit is pivotally connected to one side of the data processing unit. The display unit includes a first casing member, a second casing member, and a third casing member. The first casing member is immovably fixed on the third casing member. The second casing member can be separately combined with the first casing member. In which, the first casing member includes a first main board, two first side boards and many protrusions. The two sides of the first main board respectively has a plurality of first through slots. The two first side boards are separately disposed at the two sides of the first main board.

A plurality of second through slots are separately disposed on the two first side boards. Those first through slots are separately channeled with the second through slots. The protrusions are separately disposed into the first through slots. The second casing member includes a second main board, two second side boards, a plurality of first baffles, and many second baffles. The two second side boards are separately disposed at the two sides of the second main board. The first baffles are separately disposed on the inside of the second side board. The second baffles are separately disposed on the inside of the first baffles.

In particular, the length of the first baffle is longer than the second baffle. The first baffles are separately and movably disposed into the second through slots. Further, the second baffles are also separately and movably disposed into the first through slots. When the first baffles and the second baffles move to a specific position, the first baffles are positioned on the inside of the first main board. Therefore, the second baffles are separately on the inside of the protrusions.

Due to the above described fabrication of portions, the invention has the advantage that the notebook and the casing members can be customized. For personal preference, the pattern painted on the second casing member fabricated with the first casing member or the color thereof is also changeable. Therefore, the outward appearance of the notebook can be customized. The assembly merely moves the second casing member a short distance opposite to the first casing member, and the first baffle is then on the inside of the main board. The second baffle is particularly positioned on the inside of the protrusion. Afterward, the second casing member can be combined with the first casing member firmly and will not be easily separated.

Other objects and advantages of the present invention will become apparent from the following description of the preferred embodiments taken in conjunction with the accompanying drawings wherein like parts in each of the several figures are identified by the same reference characters.

BRIEF DESCRIPTION OF THE DRAWINGS

FIG. 3 is a three-dimensional diagram showing the fabrication of casings of the notebook computer according to the present invention;

FIG. 3A to FIG. 3D illustrate a magnification of the partial details of the notebook computer shown in FIG. 3;

DESCRIPTION OF THE PREFERRED EMBODIMENTS

Figure 1:
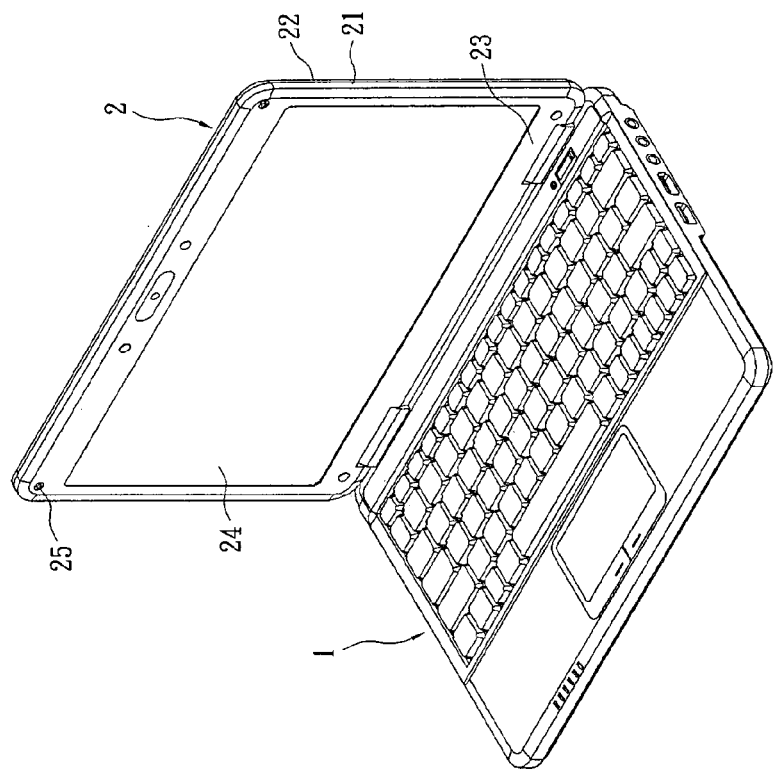
FIG. 1 is a three-dimensional diagram showing the notebook computer in accordance with the present invention.
Figure 2:
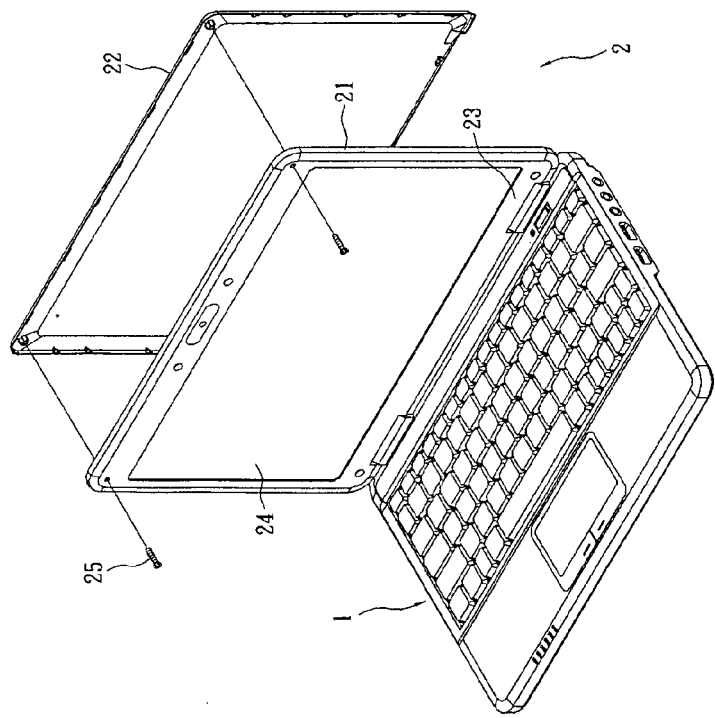
FIG. 2 is a three-dimensional diagram showing the notebook computer in accordance with the present invention.

Reference is made to FIG. 1 in view of FIG. 2 showing a preferred embodiment of the notebook computer with its casings. The notebook computer at least includes a data processing unit 1 and a display unit 2. The display unit 2 is pivotally connected to a rear side of the data processing unit 1. This data processing unit 1 generally includes some electrical circuit boards, hard disk and a keyboard. It is noted that the person having ordinary skill in the art may understand the invention from the following description without going into the details of the general notebook computer.

The display unit 2 includes a first casing member 21, a second casing member 22, a third casing member 23, a display panel 24, and two screws 25. The first casing member 21 is immovably disposed upon the third casing member 23, so as to form a space there-between for positioning the display panel 24. The second casing member 22 is separably assembled above the first casing member 21. That means that the second casing member 22 can be secured to a rear side of the first casing member 21, or separated from the first casing member 21.

Figure 3C:
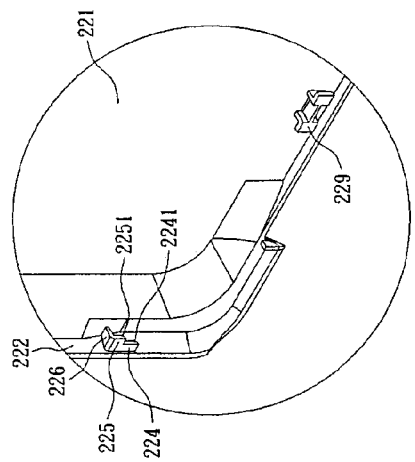
Figure 3D:
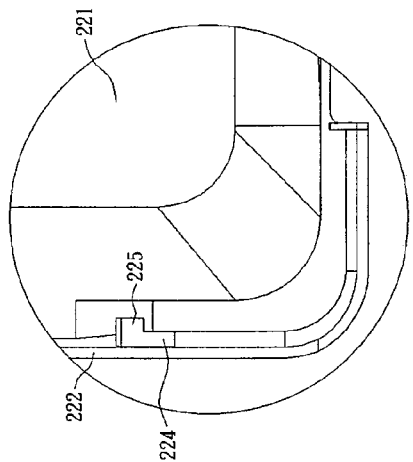

Since the second casing member 22 is joined with the first casing member 21, the two screws 25 may penetrate through the third casing member 23 and latch the fixed column 228, shown in FIG. 3, of the second casing member 22. So that, the second casing member 22 can be immovably combined with the first casing member 21.

Further details regarding the first and second casting members 21, 22 for the claimed notebook computer are described as follows:

It is noted that the directions top, bottom, left, right, front and rear are used to describe the display unit 2 in an upright state. Further, the positions inside and outside are used to describe a state of combination of the first casing member 21 and the second casing member 22. The user may see the outside of the notebook computer directly, but not the inside of the notebook computer.

Figure 4:
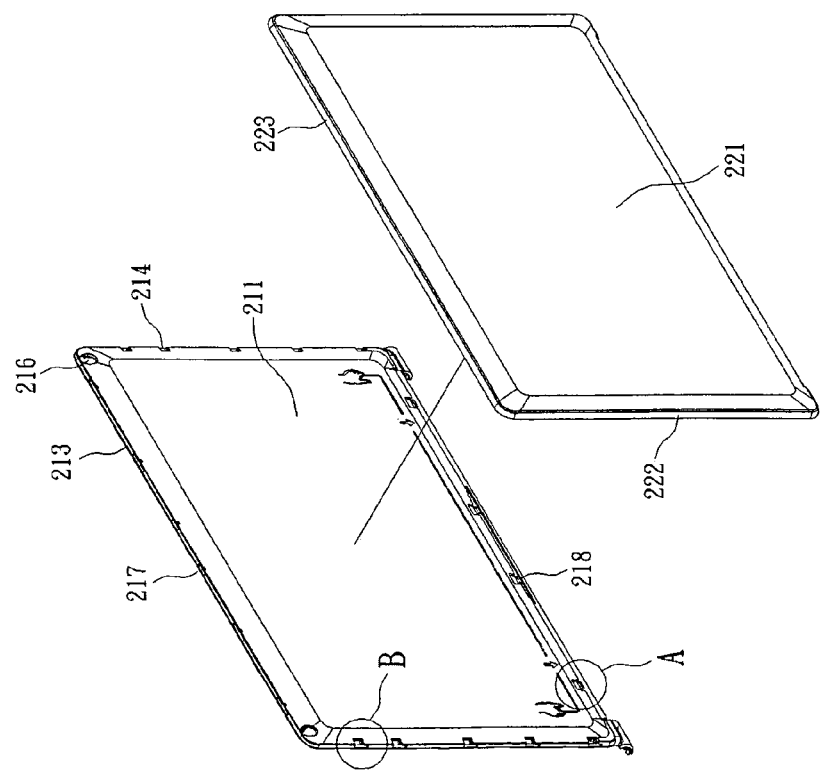
FIG. 4 shows another three-dimensional diagram of the decomposition of casings of the notebook computer in accordance with the present invention.
Figure 4A:
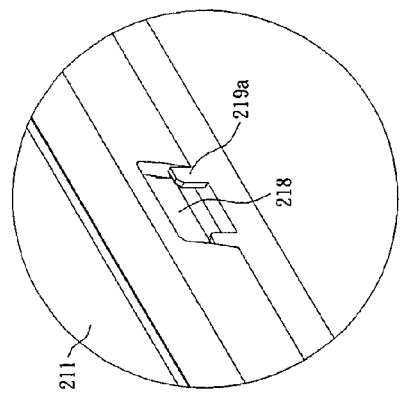
FIG. 4A to FIG. 4B illustrate a magnification of the partial details of FIG. 4.
Figure 4B:
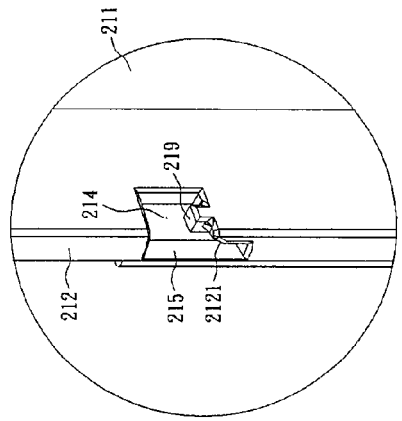

Reference is made to FIG. 3 in view of FIG. 4. The first casing member 21 particularly includes a first main board 211, two first side boards 212, a first top board 213, a plurality of first through slots 214, a plurality of second through slots 215, as shown in FIG. 3B, two third through slots 216, a plurality of fourth through slots 217, a plurality of fifth through slots 218, a plurality of protrusions 219, as shown in FIG. 3B, and baffle blocks 219a.

The mentioned first main board 211 is preferably a rectangular board. The two first side boards 212 are separately disposed at two sides of the first main board 211. The first top board 213 is disposed above the first main board 211. Therefore, a connection with the three components including the first side board 212 and the first top board 213 form an inverse U-shaped structure, and is nearly perpendicular to the first main board 211.

Furthermore, the left and right sides of the first main board 211 have some separate first through slots 214. The opening of each first through slot 214 is substantially a rectangle-like structure. The two third through slots 216 are disposed at the top side of the first main board 211 and the positions next to the board 211. Further, the openings of the two slots 216 are formed as an oval-shaped structure. The fifth through slot 218 is disposed below the first main board 211, and its opening is around a rectangle.

The second through slots 215 are separately disposed on the two first side boards 212, and their openings are formed as rectangles. The length of the second through slot 215 is longer than the first through slot 214. The second through slots 215 are separately channeled to the first through slots 214. The fourth through slots 217 are disposed on the first top board 213, and their openings are like a convex-shaped structure.

The protrusions 219 are disposed into the first through slots 214. The lower edge of the first through slot 214 extends to a upward direction. The baffle blocks 219a are separately disposed into the fifth through slots 218, and the lower edge of the fifth through slot 218 also extends to an upward direction.

According to one of the embodiments, the size of the second casing member 22 is bigger than the first casing member 21, so that the second casing member 22 can completely cover the first casing member 21. The second casing member 22 includes a second main board 221, two second side boards 222, a second top board 223, a plurality of first baffles 224, a plurality of second baffles 225, two third baffles 226, a plurality of fourth baffles 227, two fixed columns 228, and a plurality of position limiting plates 229.

In one embodiment, the second main board 221 is around a rectangular plate. The two second side boards 222 are separately disposed at the left and right sides of the second main board 221. The second top board 223 is disposed above the second main board 221. The three components including the second side board 222 and the second top board 223 are connected to form an inverse U-shaped structure. This structure is almost perpendicular to the second main board 221.

The first baffles 224 are separately disposed on the inside of the two second side boards 222, and perpendicular to the second side board 222. Further, the second baffles 225 are separately disposed on the inside of the first baffles 224. In particular, the length of the first baffle 224 is longer than the second baffle 225. The third baffles 226 are separately disposed on the inside of the two second side boards 222, and above the first baffles 224 and the second baffles 225. Furthermore, these third baffles 226 are also perpendicular to the second side board 222, the first baffle 224 and the second baffle 225. The combination of the first baffle 224, the second baffle 225 and the third baffle 226 is an L-shaped structure.

The fourth baffles 227 are separately disposed on the inside of the second top board 223. The outward appearance of the fourth baffle 227 corresponds to an opening of the fourth through slot 217. The two fixed columns 228 are separately disposed on the inside of the second main board 221. Further, each of the positions close to the left and right corners of the second main board 221 has one threaded hole 2281, the relevant reference is made to FIG. 5A.

The position limiting plates 229 are separately disposed on the inside of the second main board 221, and perpendicular to the second main board 221. The position limiting plate 229, it has a convex-like structure.

Following is described how the first casing member 21 is separably combined with the second casing member 22, other than the above-described features of the first casing member 21 and the second casing member 22.

Figure 5:
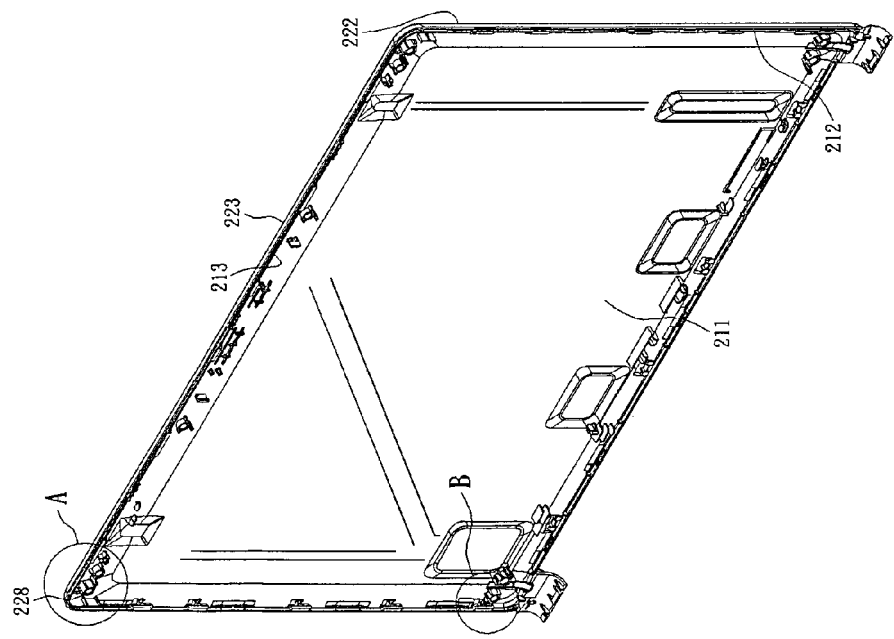
FIG. 5 shows a three-dimensional fabrication the of casings of the notebook computer in accordance with the present invention.
Figure 5A:
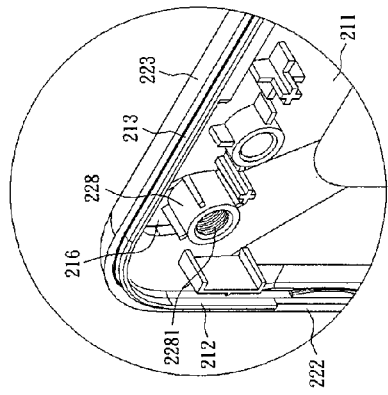
FIG. 5A to FIG. 5B shows the magnification of the partial details of FIG. 5.
Figure 5B:
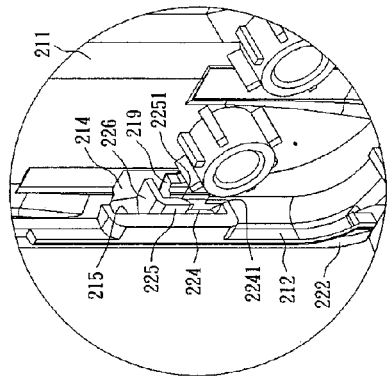
Figure 6:
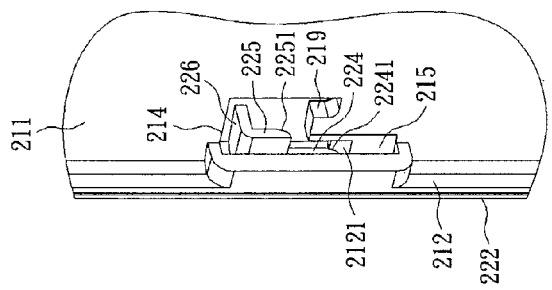
FIG. 6 shows a schematic diagram of the baffle and through slot of the notebook computer in accordance with the present invention.
Figure 7:
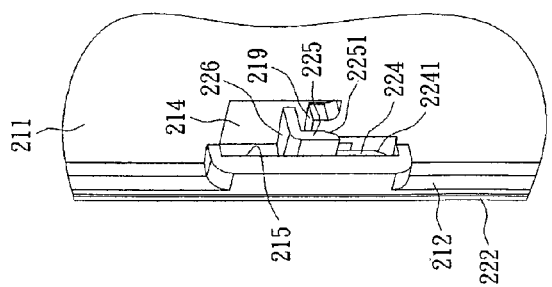
FIG. 7 is another diagram showing the baffle and through slot of casings of the notebook computer according to the present invention.

References are made to FIGS. 5 to 7. Since the second casing member 22 mechanically covers the outer portion of the first casing member 21, the first baffles 224 of the second casing member 22 are separately movable within the second through slots 215. Further, the second baffles 225 and the third baffle 226 are also separately movable within the first through slots 214. Still further, the two fixed columns 228 are respectively movable within the two third through slots 216. Further, the position limiting plates 229 are also movable within the fifth through slots 218 separately.

The second casing member 22 may move downward, so that the first baffle 224 and the second baffle 225 may move downward to a binding site. Meanwhile, those first baffles 224 are separately positioned on the inside of the first main board 211. The second baffles 225 are further positioned on the inside of the protrusions 219. The third baffles 226 separately contact the side upon those protrusions 219 in order to restrict the downward movement of the second casing member 22. The fourth baffles 227 separately move into the fourth through slots 217. Further, the position limiting plates 229 separately move to the inner sides of those baffle blocks 219a.

Thus the second casing member 22 will not depart from the first casing member 21, and is immovably combined with the first casing member 21. After that, a screw 25 is used to penetrate the third casing member 23, and to mate the threaded hole 2281 of the fixed column 228 of the second casing member 22. Therefore, the second casing member 22 can be more steadily combined with the first casing member 21.

Furthermore, each of the first baffles 224 has a first slope 2241. The two first side boards 212 respectively have their own second slopes 2121, and second slopes 2121 are separately inside the second through slots 215, and correspond to first slopes 2241. Further, each second baffle 225 has one third slope 2251. Thus the first baffle 224 and the second baffle 225 may smoothly move to the inner side between the first main board 211 and the protrusion 219.

On the one hand, if the second casing member 22 would be separated from the first casing member 21, the mentioned screw 25 may firstly be screwed out of the threaded hole 2281. Then the second casing member 22 moves upward, and second casing member 22 may move to the opposite direction. Then the separation is done. Therefore, any new stuff in compliance with the second casing member 22 may be used to combine with the first casing member 21.

To sum up the above description, the claimed notebook computer provides its user the ability to combine the second casing member to the first casing member according to preference. The invention provides an easier combination since it requires fewer steps and less energy. Furthermore, the second casing member can be immovably combined with the first casing member after the fabrication.

The invention being thus described, it will be obvious that the same may be varied in many ways Such variations are not to be regarded as a departure from the spirit and scope of the invention, and all such modifications as would be obvious to one skilled in the art are intended to be included within the scope of the following claims.

What is claimed is:

1. A casing of a notebook computer, comprising:
a first casing member having a first main board, further comprising a first top board and two first side boards disposed surrounding the first main board, and a plurality of first through slots and second through slots separately disposed on the two first side boards; wherein the first through slots are separately channeled with the second through slots via a plurality of protrusions; and a second casing member separably combined with the first casing member and having a second main board, further comprising a second top board and two second side boards disposed surrounding the second main board, and a plurality of first baffles and second baffles disposed on the inside of the second side boards; and the second baffles are separately disposed on the inside of the first baffles; wherein the length of the first baffles are longer than the second baffles, and the first baffles are separately and movably positioned into the second through slots, and the second baffles are separately and movably positioned into the first through slots;

whereby, when the first baffles and the second baffles move to a position, the first baffles are positioned on the inside of the first main board, and the second baffles are separately positioned on the inside of the protrusions.

2. The casing of claim 1, wherein each first baffle has a first slope, and each first side board has a plurality of second slopes, wherein the second slopes are separately disposed into the second through slots opposite to the first slopes.

3. The casing of claim 2, wherein the second casing member has a plurality of third baffles and the third baffles being separately disposed on the inside of the two second side boards and above the first baffles and the second baffles.

4. The casing of claim 3, further comprising two third through slots disposed above the first main board, and the second casing member includes two fixed columns.

5. The casing of claim 4, wherein the two fixed columns are separately disposed on the inside of the second main board, and movably in the midst of the two third through slots, and each of the two fixed columns has a threaded hole.

6. The casing of claim 5, wherein the first casing member has the first top board disposed above the first main board, and a plurality of fourth through slots disposed on the first top board.

7. The casing of claim 2, wherein each second baffle has a third slope.

8. The casing of claim 7, wherein the second casing member has a plurality of third baffles and the third baffles being separately disposed on the inside of the two second side boards and above the first baffles and the second baffles.

9. The casing of claim 8, further comprising two third through slots disposed above the first main board, and the second casing member includes two fixed columns.

10. The casing of claim 9, wherein the two fixed columns are separately disposed on the inside of the second main board, and movably in the midst of the two third through slots, and each of the two fixed columns has a threaded hole.

11. The casing of claim 10, wherein the first casing member has the first top board disposed above the first main board, and a plurality of fourth through slots disposed on the first top board.

12. The casing of claim 1, wherein the second casing member has a plurality of third baffles and the third baffles being separately disposed on the inside of the two second side boards and above the first baffles and the second baffles.

13. The casing of claim 12, further comprising two third through slots disposed above the first main board, and the second casing member includes two fixed columns.

14. The casing of claim 13, wherein the two fixed columns are separately disposed on the inside of the second main board, and movably in the midst of the two third through slots, and each of the two fixed columns has a threaded hole.

15. The casing of claim 14, wherein the first casing member has the first top board disposed above the first main board, and a plurality of fourth through slots disposed on the first top board.

16. The casing of claim 15, the second casing member has a second top board and a plurality of fourth baffles, wherein the second top board is disposed above the second main board, and the fourth baffles are separately disposed on the inside of the second top board; when the first baffles and the second baffles move to the position, the fourth baffles separately move in the midst of the fourth through slots.

17. The casing of claim 16, further comprising a plurality of fifth through slots disposed below the first main board.

18. The casing of claim 17, wherein the first casing member has a plurality of pairs of baffle blocks, which are separately disposed in the midst of the fifth through slots.

19. The casing of claim 18, the second casing member has a plurality of position limiting plates which are separately disposed on the inside of the second main board; when the first baffles and the second baffles move to the position, the position limiting plates separately move to the inner sides of the baffle block.

* * * * *